Oct. 27, 1931.    C. HYDEN    1,829,142
AERIAL CAMERA MOUNT
Filed May 8, 1925    2 Sheets-Sheet 2
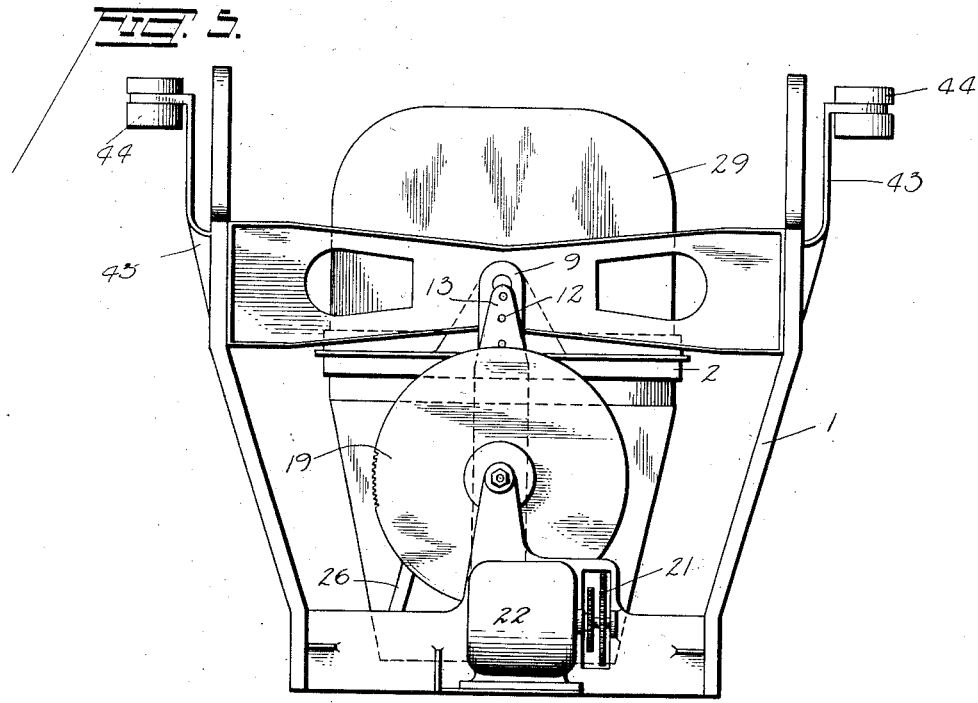
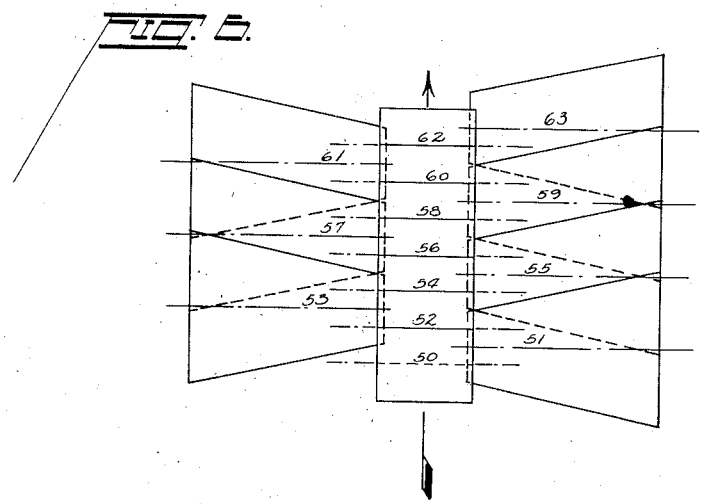
INVENTOR
CARL HYDEN
BY
ATTORNEY

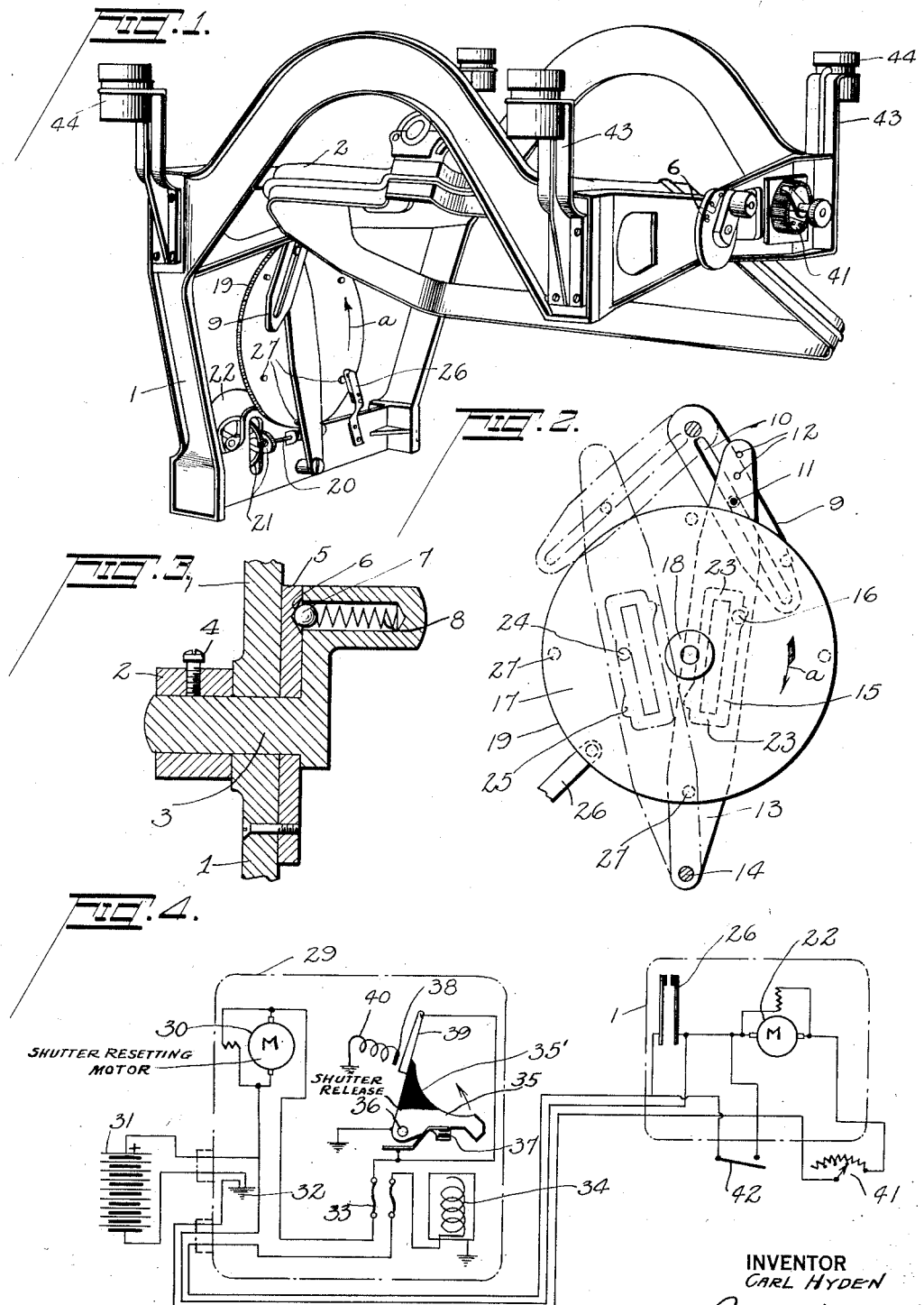

UNITED STATES PATENT OFFICE

CARL HYDEN, OF DAYTON, OHIO

AERIAL CAMERA MOUNT

Application filed May 8, 1925. Serial No. 28,837.

This invention relates to aerial camera mounts, and the primary object is the provision of a mount of this character which will enable pictures to be taken of the ground while the mount is automatically oscillated from side to side, so as to take a series of perpendicular and oblique pictures which can later be assembled for use as a map.

The invention is of primary importance in aerial mapping and in reconnaissance work in time of war, since a single aircraft can accomplish what has hitherto required several planes and a number of operators. A single air plane can fly at a high altitude thus enabling a large part of the ground to be included in the pictures and by using a single long focus camera, supported in the mount, can secure a picture of a very large strip of territory by taking one perpendicular picture and either one, two or three oblique pictures on each side of the vertical as the aircraft flies along its course. The detail of the pictures secured by a long focus camera will be at a maximum, although the weight of the single camera will be far less than a number of fixedly mounted cameras to do the same work.

A mounting base is provided for pivotally holding a camera support, and a mechanism is provided for automatically oscillating the support from side to side. Speed regulating means are provided for governing the speed at which the mechanism is oscillated so that the support may be moved at a speed dependent upon the aircraft speed. Means are provided to temporarily stop the oscillation of the camera support when the camera axis is vertical, and also when the camera axis is at a predetermined inclined angle to the vertical so that at this instant an electrically governed means will cause the operation of the camera shutter, thus enabling the picture to be taken at a time when the camera axis is stationary as far as relative movement is concerned.

Further objects and advantages will be more fully set forth in the attached specification, in the claims, and in the drawings in which Fig. 1 is a perspective view of the camera mount and mounting base.

Fig. 2 is an end elevation of the camera support oscillating mechanism.

Fig. 3 is a detail section through the releasable holding means, and

Fig. 4 is a wiring diagram of the camera and camera mount.

Fig. 5 is an end elevation of the camera mount with the camera supported therein, and Fig. 6 is a diagram of a picture assembly showing a complete map.

Referring to the drawings more particularly by reference numerals, the mounting base designated generally 1, is adapted to be held above the floor of an airplane fuselage, adjacent the operator thereof. This base supports the camera frame 2 on a horizontal axis, by means of end trunnions which find a bearing in the base. One of these trunnions is indicated at 3 and the camera support 2 is attached thereto and held from relative movement thereon by the pin 4. Rigidly fastened to the base 1 adjacent to the trunnion 3, is a locking plate 5 provided with a series of depressions 6, which are adapted to receive therein one end of a ball 7 which is pressed into the depressions 6 by means of a spring 8. Slightly less than half of the ball 7 is adapted to be inserted into one of the depressions so that a means is provided for releasably holding the camera support by permitting the immediate movement of the support when power is applied for this purpose. The camera support is provided with a rigid downwardly extending rock arm 9 which is provided with a slot 10, within which operates a pin 11 securely fastened in one of a series of holes 12 in the upper end of an oscillating arm 13 which is pivoted at 14 to the base 1.

This oscillating arm 13 is provided with a cam groove 15 which is of generally rectangular shape as indicated in Fig. 2. Within this groove a pin 16 is adapted to move, this pin 16 being fastened to a rotatable member or wheel 17 which is pivoted at 18 upon an upright extending from the supporting base 1. The periphery is engaged by a worm provided on a shaft 20 which is geared at 21 to a motor 22 which is mounted upon the base 1. The motor 22 is electrically energized so as to rotate the worm wheel 17 at a fairly constant speed in the direction of the arrow *a* as shown in Fig. 1. As the wheel is rotated the pin 16 operates in the cam slot 15 so as to swing the oscillating arm 13 from side to side, thus causing the oscillation of the rigid arm 9 and the camera frame.

It will be observed that when the pin 16 is at the points 23 in the cam groove the oscillating arm 13 will be in a vertical position and the pin 16 will be travelling in the groove without causing any movement of the arm 13; consequently at this point the camera will be temporarily held stationary for a short period of time during which an exposure may be made. Similarly, when the pin 16 is at the point 24 as indicated in dash lines in Fig. 2, the camera will be maintained stationary instantaneously while the motion reverses. This position indicates the extreme position of tilt of the camera. Additional grooves, such as indicated at 25, may be provided in the cam groove 15 so as to momentarily stop the movement of the camera to enable intermediate oblique pictures to be taken.

Mounting upon the supporting base 1 are a pair of contact arms 26 which are adapted to be closed so as to cause the operation of the camera shutter at predetermined points in the cycle of operation. A series of projections 27 are provided on the inner face of the worm wheel 17 and these projections are adapted to periodically and successively close the contact at 26 at a time when the camera is temporarily stationary. With the arrangement as shown in Figs. 1 and 2, six contacts are provided so that the camera shutter is operated six times in each cycle of operation. Pictures are taken as the airplane flies through the air on a straight course and if a proper overlap is provided the pictures may be assembled to provide a complete map of the territory flown over. A suitable numbering mechanism is provided to indicate the time and the angular position of the picture as well as the altitude and any other reference desired. It will now be apparent that one man may fly the airplane and also take the pictures since the camera needs practically no attention. In addition the flying hours necessary to make a required map or picture of a territory is cut to a fraction of what it formerly was. This is an extremely important feature, since the flying time in the air is exceedingly expensive.

In Fig. 6 is shown a map composed of a plurality of overlapping pictures in which the aircraft, flying in the direction of the arrow, takes pictures 50 to 63 consecutively, the pictures being taken with the camera pointed straight down and pointed to each side of the line of flight at a desirable predetermined angle of inclination.

Referring now to Fig. 4, the numeral 29 designates generally the outline of the aerial camera and it will be understood that this camera is provided with the motor 30, which operates the shutter resetting device, and also rolls up the film after an exposure has been made. An electrical battery 31 is connected at its positive end to one side of the motor 30 which is supported in the camera. The other end of the battery is grounded at 32 to the frame. The contacts 26 which are supported on the base casting are electrically connected as shown so that when the contacts are closed by the knobs 27 as previously stated, a circuit will be made through the battery and through the fuse 33 so as to energize a solenoid 34. The instant the solenoid is energized a trip 35 pivoted at 36 is moved counterclockwise so as to release the shutter of the camera by mechanical means, not shown and permit a proper exposure of the film. The trip 35 when moved counterclockwise closes an electrical contact at 37 which connects the battery in series with the motor 30, thus energizing the motor which winds the film upon the roll, and winds the spring operating the shutter. The trip 35 is also provided with a projection of insulating material 35′ which moves a pivoted arm 39 so as to close a contact at 38. This contact is maintained closed by means of the inductance coil 40 so as to permit the continued operation of the motor 30 until its purpose has been fulfilled and the trip 35 has returned to its normal position.

The motor 22 which operates the mechanism for oscillating the support from side to side is shown in Fig. 4 connected to the speed controlling rheostat 41, which enables the motor 22 to be started manually and its speed adjusted so as to bear the proper relation to the speed of the aircraft. The speed of the motor 22 should be such that a proper overlap is obtained in the subsequent pictures taken. An overlap of 20% has been found very desirable. The motor 22 is connected in series with the battery 31 when the circuit is closed through the rheostat 41 and this motor is of the shunt type so as to have a fairly constant speed except when the rheostat is operated. A manually operated switch 42 is provided upon a suitable spot on the base casting 1. This switch is adapted to connect the battery in series with the trip 35 to take a picture when it is desired to do so without throwing the automatic control into play, that is the manually operated switch 42 is provided to permit a series of oblique pictures to be taken if such should be desired.

The main base supporting casting 1 is adapted to be held by means of the supporting straps 43 and it is desirable to provide some means for shielding the camera and its support from vibrations or angular movement of the aircraft. For this purpose a yielding shock absorbing material as indicated at 44 may be provided between the arms 43 and the beams of the aircraft to which they are attached. Instead of the resilient shock absorbing pieces 44 the arms 43 may be connected to a frame which is gyroscopically stabilized, so that in such case small angular movements of the aircraft may be permitted without interfering with the accurate picturing of the ground.

I am aware that various modifications may be made in the scope of my invention and do not intend to be limited to the exact construction which has been chosen for purposes of illustration.

I claim:

1. In an aerial camera mount, in combination a mounting base, a camera support pivoted thereon and adapted to hold a camera with its axis normally vertical, mechanism for oscillating said support from side to side, means for temporarily arresting the oscillation of said support, and means for operating the camera shutter while the support is temporarily stationary.

2. In an aerial camera mount in combination a mounting base, a camera support pivoted thereon on a horizontal axis, and adapted to hold a camera with its axis normally vertical, mechanism for automatically oscillating said support from side to side, means for temporarily arresting the oscillation of said support when the camera axis assumes a vertical position, and means for automatically operating the camera shutter while the support is temporarily stationary.

3. An aerial camera mount as set forth in claim 1, together with means for controlling the speed of said mechanism.

4. In an aerial camera mount in combination a mounting base, a camera support horizontally pivoted thereon adapted to hold a camera with its axis normally vertical, motor driven mechanism for oscillating said support from side to side, means for controlling the speed of said mechanism, means for temporarily arresting the oscillation of said support when the camera axis is vertical, and at predetermined angles to the vertical, and means for automatically operating the camera shutter while the support is stationary.

5. In an aerial camera mount, in combination, a mounting base, a camera support horizontally pivoted thereon and adapted to hold a camera with its axis normally vertical, mechanism for oscillating said support from side to side comprising a driven rotary member, an arm rigid with said support, an oscillating arm pivoted to said base, and pin and slot connections between said arms and said member, said slot connection being so arranged as to arrest the movement of said support when the camera axis is vertical, and means for operating the camera shutter when the motion of the support is temporarily arrested.

6. In an aerial camera mount as set forth in claim 5, means for releasably locking said support to said base when said support assumes a certain predetermined position.

7. In an aerial camera mount, in combination, a mounting base, a camera support pivoted thereon and adapted to hold a camera with its axis normally vertical, motor driven mechanism for oscillating said support from side to side, comprising an arm pivoted to said base, a rotating motor driven member, a pin and slot connection between said arm and member, a rigid arm on said support, an adjustable connection between said two arms, said slot being so designed as to stop the oscillation of said support when the camera axis is vertical and at predetermined angles to the vertical, and means for operating the camera shutter automatically while the support is temporarily stationary.

8. In an aerial camera mount as set forth in claim 7, means for releasably locking said support to said base in a predetermined position, and means for governing the speed of said motor driven mechanism.

9. An aerial camera mount as set forth in claim 1, together with vibration damping means interposed between said mounting base and the aircraft, and spring pressed means for automatically releasably locking the said support to said base when the oscillation of said support is temporarily arrested.

10. An aerial camera system comprising a camera support pivotally mounted for movements about a substantially horizontal axis extending longitudinally of the aircraft, a camera supported thereon with its axis normally substantially vertical, means for automatically oscillating said support back and forth from one side to the other about said axis, and means for operating the camera shutter at predetermined angular positions of the camera axis.

In testimony whereof I affix my signature.

CARL HYDEN.